US010400423B1

(12) United States Patent
Beasley et al.

(10) Patent No.: US 10,400,423 B1
(45) Date of Patent: Sep. 3, 2019

(54) RADIATOR GUARD AND METHOD OF MAKING

(71) Applicant: Caterpillar Inc., Deerfield, IL (US)

(72) Inventors: Christopher Ryan Beasley, Peoria, IL (US); Kelly Ann Scholz, Peoria, IL (US); Eric M. Prater, Washington, IL (US); Vuong Duc Ngo, Peoria, IL (US)

(73) Assignee: Caterpillar Inc., Deerfield, IL (US)

( * ) Notice: Subject to any disclaimer, the term of this patent is extended or adjusted under 35 U.S.C. 154(b) by 0 days.

(21) Appl. No.: 16/151,394

(22) Filed: Oct. 4, 2018

(51) Int. Cl.
*E02F 9/08* (2006.01)
*B60R 19/52* (2006.01)
*E02F 3/76* (2006.01)

(52) U.S. Cl.
CPC ............ *E02F 9/0866* (2013.01); *B60R 19/52* (2013.01); *E02F 3/7618* (2013.01); *B60R 2019/525* (2013.01); *B60Y 2200/411* (2013.01)

(58) Field of Classification Search
CPC .. E02F 9/0866; B60R 19/52; B60R 2019/525; B60Y 2200/411
See application file for complete search history.

(56) References Cited

U.S. PATENT DOCUMENTS

| 2,921,392 | A |  | 1/1960 | Bidwell |  |
| 3,825,074 | A |  | 7/1974 | Stedman et al. |  |
| 4,023,625 | A |  | 5/1977 | Krolak et al. |  |
| 4,403,648 | A | * | 9/1983 | Styok | F28F 9/002 165/149 |
| 6,648,088 | B2 | * | 11/2003 | Gabioli | E02F 3/325 123/41.43 |
| 7,938,215 | B2 | * | 5/2011 | Leconte | B60K 11/04 165/42 |
| 8,544,584 | B2 | * | 10/2013 | Takeda | E02F 9/26 165/41 |
| 9,751,394 | B1 | * | 9/2017 | Speichinger | B60K 11/04 |
| 2008/0283214 | A1 | * | 11/2008 | Starkey | B60K 11/04 165/41 |
| 2016/0356016 | A1 |  | 12/2016 | Hicke |  |
| 2018/0326935 | A1 | * | 11/2018 | Miller | B60K 11/04 |

FOREIGN PATENT DOCUMENTS

| JP | 2004017705 A | 1/2004 |
| KR | 100656040 B1 | 12/2006 |

* cited by examiner

*Primary Examiner* — Brian L Swenson
(74) *Attorney, Agent, or Firm* — Lee & Hayes, PLLC

(57) ABSTRACT

A radiator guard may include a front plate, a top plate, spaced side plates, gussets and yoke assemblies. The front plate may have a varied profile such that a first lateral width proximate a top of the front plate is greater than a second lateral width proximate a bottom of the front plate. The top plate may be angled relative to the front plate and the side plates may be fixed near the lateral sides of the front plate such that portions of the front plate proximate the top of the front plate extend laterally outwardly from the side plates. The gussets may be disposed on the rear surface of the face plate at these laterally extending portions and the yoke assemblies may be disposed on the front surface of these portions.

23 Claims, 6 Drawing Sheets

RADIATOR GUARD AND METHOD OF MAKING

TECHNICAL FIELD

This disclosure relates generally to industrial machines, and, more specifically, to a radiator guard for protecting a radiator and for mounting an assembly, such as a bulldozer assembly, to a machine, such as a track-type tractor.

BACKGROUND

Some conventional bulldozer assemblies, such as those mounted proximate the front end of a tractor, include a blade moveable by one or more cylinders. In some arrangements, the cylinder(s) are secured to the tractor using a cooperating radiator guard design and yoke assembly. For instance, the radiator guard may be formed with one or more sockets, e.g., corresponding in number with the cylinder(s), and the yoke assembly includes an attachment mechanism for securing the piston and a distal arm sized to be received in one of the socket(s). Once received in the socket, the distal arm must be regularly maintained, e.g., by greasing. However, failure of the yoke assembly often requires a complete removal and replacement of the radiator guard. Moreover, radiator guards according to conventional designs are costly and very time-consuming to manufacture. For instance, the yoke assembly is generally a cast or forged part, as may be the sockets. Accordingly, it may be useful to provide an improved radiator guard that is more readily manufactured, eliminates the sockets and yoke assemblies of conventional designs, and requires less maintenance.

An example conventional structure mounting a bulldozer assembly to a vehicle is described in U.S. Pat. No. 4,023,625 (hereinafter referred to as the '625 reference). In particular, the '625 reference describes a mounting structure that includes lift jacks connected to a radiator guard extending about the vehicle engine coolant radiator. The structure described in the '625 reference includes a portion connected to the lift jacks and a portion receiving in a socket provided in a corner portion of the radiator guard. Thus, '625 reference teaches an arrangement like the yoke assemblies discussed above, and does not, however, disclose details related to a radiator guard assembly free of mounting sockets and yoke assemblies received in those sockets. The '625 reference also does not disclose an easily-manufactured radiator guard with reduced maintenance requirements. As a result, the techniques described in the '625 reference are labor and cost-intensive.

Example embodiments of the present disclosure are directed toward overcoming the deficiencies described above.

SUMMARY

In an aspect of the present disclosure, a radiator guard includes a front plate, a top plate, a first side plate, a second side plate, a first gusset, a second gusset, a first yoke assembly, and a second yoke assembly. The front plate includes a front face and a rear face spaced from the front face and extends between a first lateral side and a second lateral side. A first lateral width is a first distance between the first lateral side and the second lateral side proximate a top of the front plate and is greater than a second lateral width that is a second distance between the first lateral side and the second lateral side proximate a bottom of the front plate. The top plate is angled relative to the front plate and fixed relative to the front plate proximate the top of the front plate. The top plate includes a top surface and a bottom surface spaced from the top surface. The first side plate is fixed to the rear face of the front plate and to the bottom surface of the top plate and is relatively nearer the first lateral side and having a first outer surface. The second side plate is fixed to the rear face of the front plate and to the bottom surface of the top plate, is relatively nearer the second lateral side than the first side plate, and has a second outer surface. The first gusset is affixed to the rear face of the front plate, the bottom surface of the top plate, and the first outer surface of the first side plate. The second gusset is affixed to the rear face of the front plate, the bottom surface of the top plate, and the second outer surface of the second side plate. The first cylinder yoke assembly is proximate the first lateral side and the top of the front plate and is configured to retain a first lift cylinder. The second cylinder yoke assembly is arranged proximate the second lateral side and the top of the front plate and is configured to retain a second lift cylinder.

In another aspect of this disclosure, a machine includes a tractor includes a frame, a radiator disposed on the frame, a bulldozer assembly comprising a blade, a first lift cylinder, and a second lift cylinder, and a radiator guard at least partially surrounding the radiator. The first lift cylinder and the second lift cylinder are configured to selectively raise and lower the blade relative to the frame. The radiator guard may include a face plate, a first side plate, a second side plate, a first gusset, a second gusset, a first cylinder yoke assembly and a second cylinder yoke assembly. The face plate includes a front plate portion and a top plate portion angled relative to the front plate portion, the front plate extending between a first lateral side and a second lateral side, a first lateral width comprising a first distance between the first lateral side and the second lateral side proximate the top plate portion being greater than a second lateral width comprising a second distance between the first lateral side and the second lateral side proximate a bottom of the front plate. The first side plate is fixed to a rear face of the front plate portion and to a bottom surface of the top plate portion, the first side plate relatively nearer the first lateral side and having a first outer surface. The second side plate is fixed to the rear face of the front plate and to the bottom surface of the top plate, the second side plate relatively nearer the second lateral side than the first side plate. The first gusset is affixed to the rear face of the front plate, the bottom surface of the top plate, and the first outer surface of the first side plate. The second gusset is affixed to the rear face of the front plate, the bottom surface of the top plate, and the second outer surface of the second side plate. The first cylinder yoke assembly is arranged proximate the first lateral side and the top of the front plate and configured to support the first piston; and the second cylinder yoke assembly is arranged proximate the second lateral side and the top of the front plate and configured to support the second piston.

In yet another aspect of this disclosure, a method of manufacturing a radiator guard includes providing a face plate. The face plate includes a front plate portion and a top plate portion angled relative to the front plate portion. The front plate portion includes a front face and a rear face spaced from the front face and extends between a first lateral side and a second lateral side. A first lateral width is a first distance between the first lateral side and the second lateral side proximate the top plate portion and is greater than a second lateral width that is a second distance between the first lateral side and the second lateral side proximate a bottom of the front plate. The method may also include providing a first side plate, the first side plate having a first outer surface, a first inner surface spaced from the first outer surface, a first side front edge, and a first side top edge. The method may also include affixing the first side plate to the face plate proximate the first lateral side by affixing the first side front edge to the rear face of the front plate portion and affixing the first side top edge to a bottom surface of the top plate portion. The method may also include providing a second side plate, the second side plate having a second outer surface, a second inner surface spaced from the second outer surface, a second side front edge, and a second side top edge. The method may also include affixing the second side plate to the face plate proximate the second lateral side by affixing the second side front edge to the rear face of the front plate portion and affixing the first side top edge to the bottom surface of the top plate portion, the first side plate and the second side plate being affixed such that the first inner surface faces the second inner surface. The method may also include providing a first gusset comprising a first gusset plate, the first gusset plate having a first portion angled relative to a second portion, a first edge comprising a portion of the first portion and the second portion, a first top edge at a distal end of the first portion, and a first bottom edge at a distal end of the second portion. The method may also include affixing the first gusset plate to the face plate and to the first side plate, the affixing comprising affixing the first edge to the first outer surface, affixing the first top edge to the bottom surface of the top plate, and affixing the first bottom edge to the rear face of the front plate. The method may also include providing a second gusset comprising a second gusset plate, the second gusset plate having a third portion angled relative to a fourth portion, a second edge comprising a portion of the third portion and the fourth portion, a second top edge at a distal end of the third portion, and a second bottom edge at a distal end of the fourth portion. The method may also include affixing the second gusset plate to the face plate and to the second side plate, the affixing comprising affixing the second edge to the second outer surface, affixing the second top edge to the bottom surface of the top plate, and affixing the second bottom edge to the rear face of the front plate.

DETAILED DESCRIPTION

This disclosure generally relates to radiator guards for industrial machines, such as tractors, that are also configured to provide an attachment location for cylinders configured to selectively raise and lower a tool, such as a blade of a bulldozer. Wherever possible, the same reference numbers will be used through the drawings to refer to the same or like features.

Figure 1:
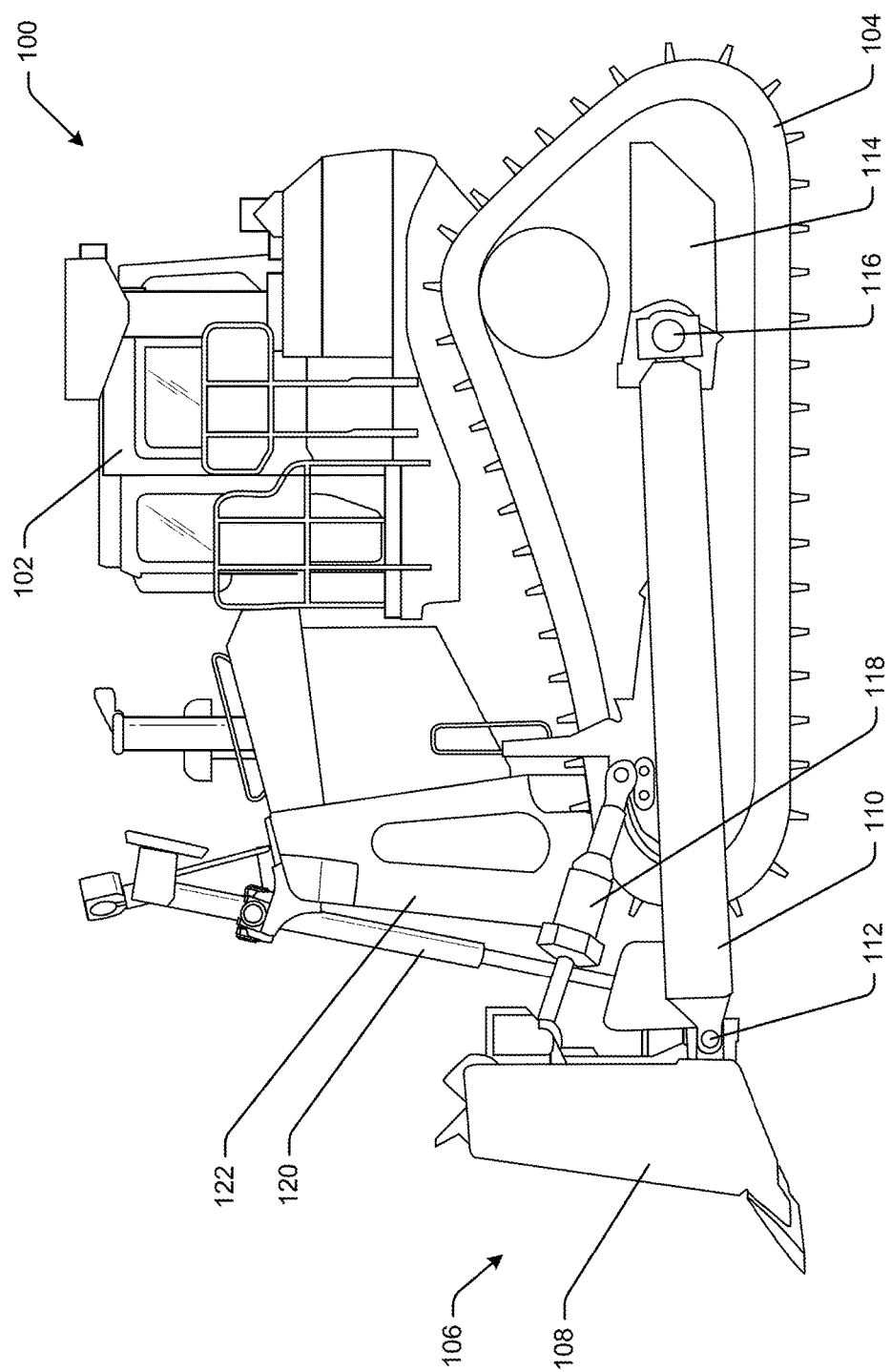
FIG. 1 is a side view of a track-type tractor including a radiator guard, in accordance with an example embodiment of the present disclosure.

Referring to FIG. 1, an example tractor 100 generally includes a cabin 102 configured to house an operator, a track 104 upon which the tractor 100 moves across a surface, and a bulldozer assembly 106 for moving materials on or at the surface. The bulldozer assembly 106 generally includes a blade 108 mounted to two push arms 110 at blade pivots 112 (only one of the push arms 110 and one of the blade pivots 112 is illustrated in FIG. 1). The push arm 110 is mounted to a frame 114 of the tractor 100 about an arm pivot 116. The bulldozer assembly 106 may also include a tilt cylinder 118 extending between an upper portion of the blade 108 and the push arm 110. The tilt cylinder 118 may be selectively actuated to pivot the blade 108 about the blade pivot 112. The blade 108 may be raised and lowered by a pair of lift cylinders 120, e.g., which may cause the push arms 110 to pivot about the arm pivot 116. As also illustrated in FIG. 1, the lift cylinders 120 are mounted to a radiator guard 122, generally disposed at a front of the tractor 100.

Figure 2:
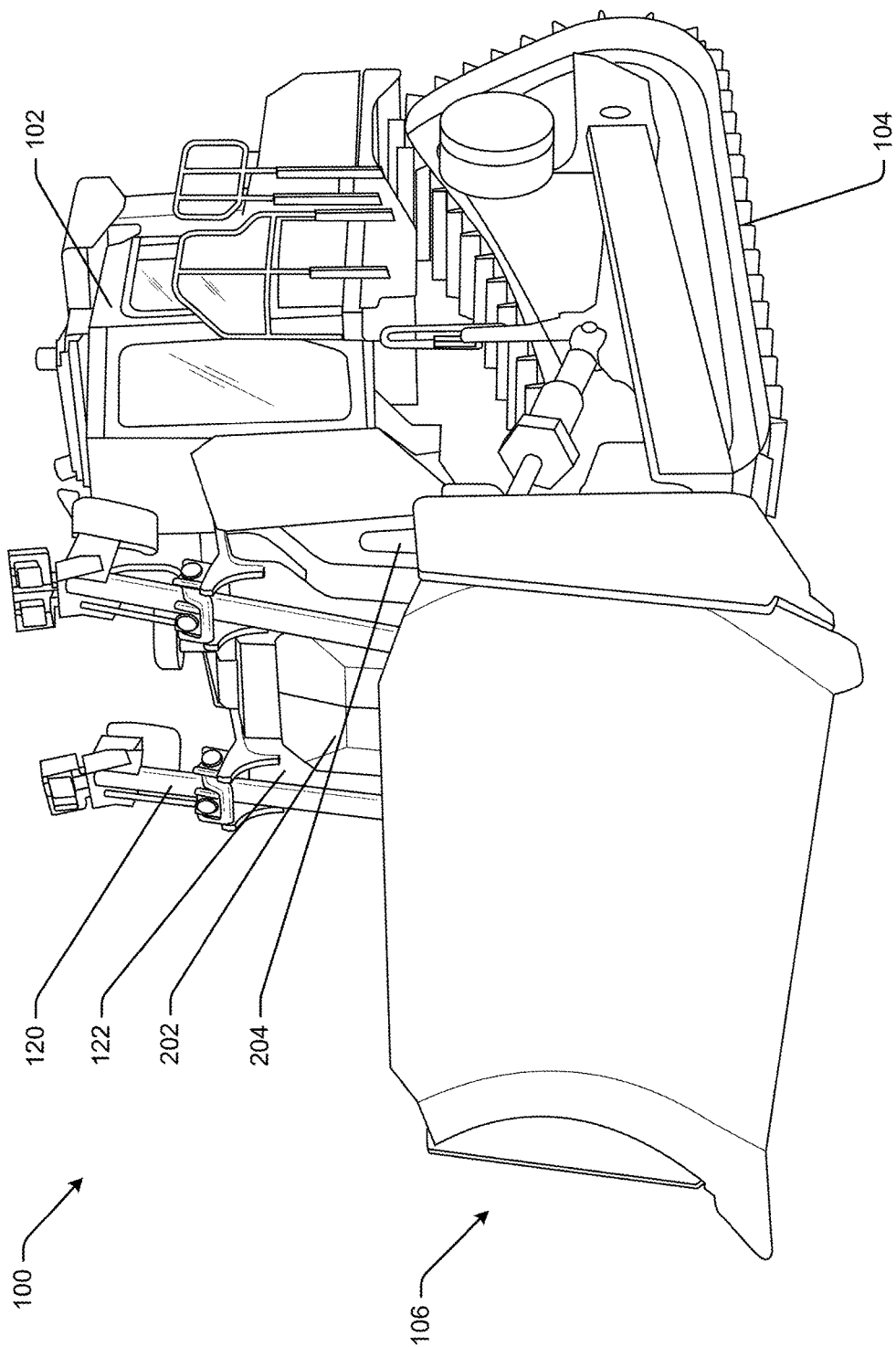
FIG. 2 is a perspective view of the track-type tractor illustrated in FIG. 1, in accordance with an example embodiment of the present disclosure.
Figure 3:
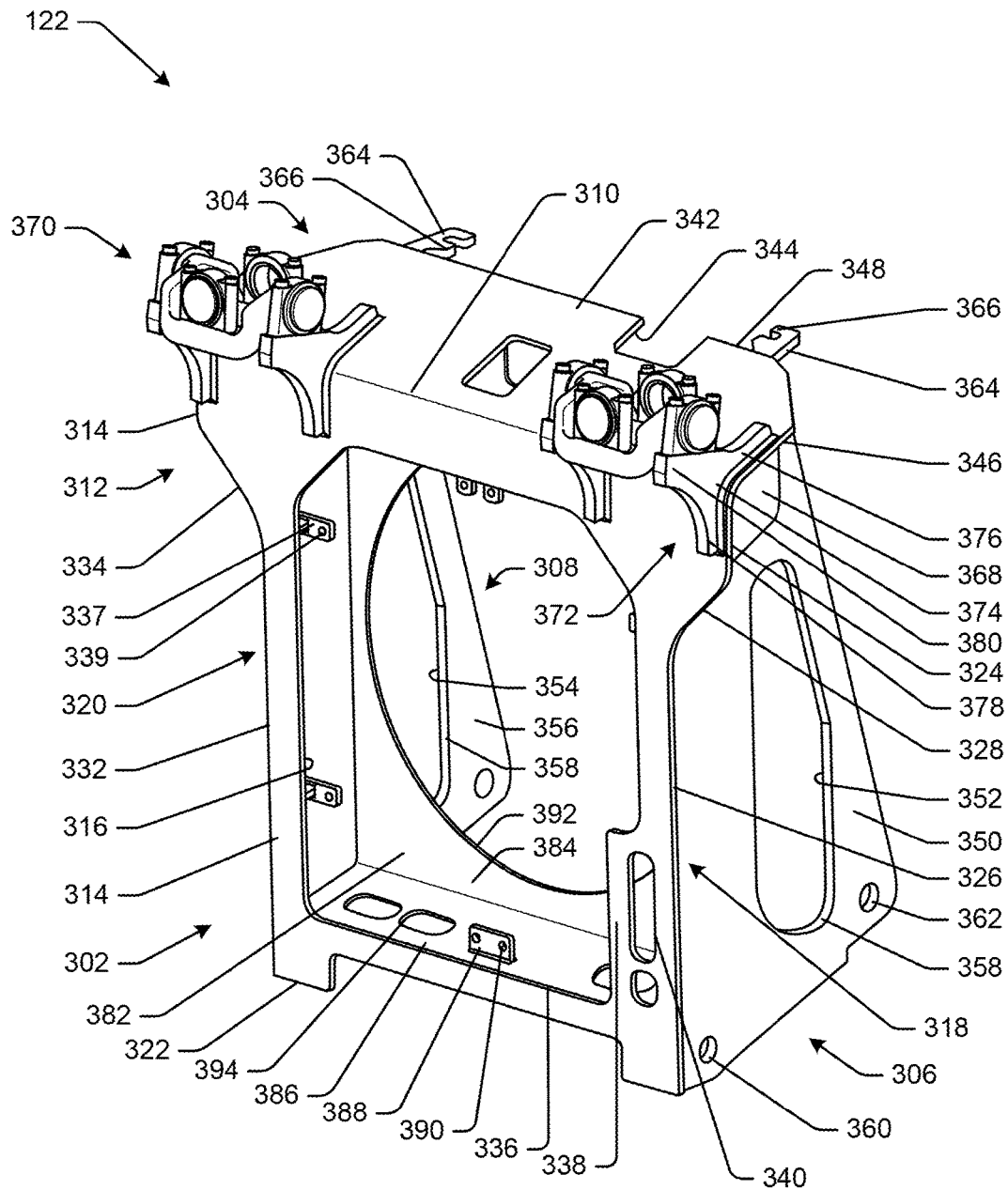
FIG. 3 is a front perspective view of the radiator guard of FIGS. 1 and 2, in accordance with an example embodiment of the present disclosure.
Figure 4:
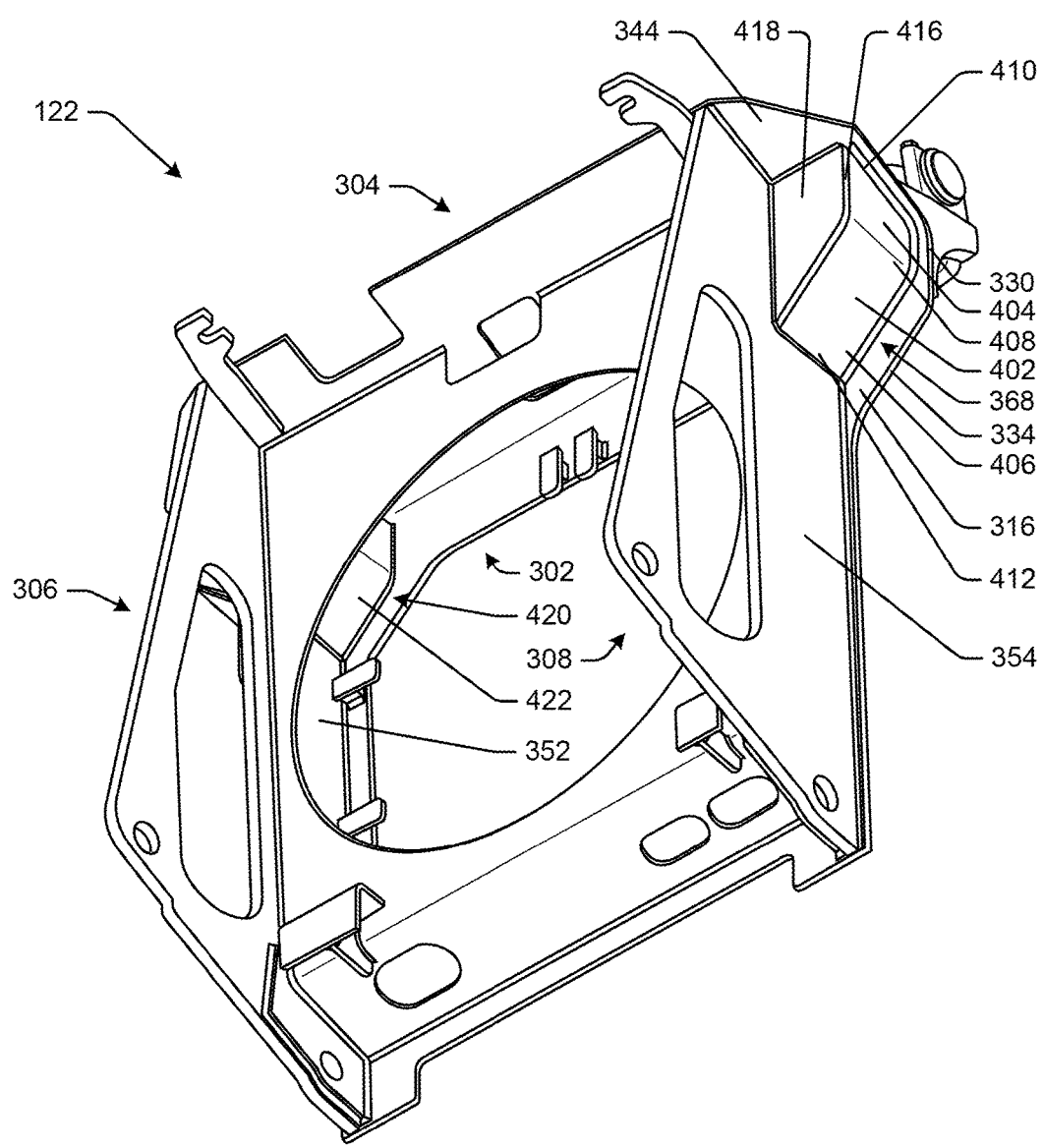
FIG. 4 is a rear perspective view of the radiator guard of FIG. 3, in accordance with an example embodiment of the present disclosure.

FIG. 2 is a perspective view of the tractor 100, generally showing the two lift cylinders 120 spaced from each other and supported by the radiator guard 122. FIG. 2 also shows a screen 202, which may be a grill or similar structure that allows air to enter an interior space of the radiator guard 122. As detailed herein, the radiator guard 122 may include an opening over the which the screen 202 is removably placed. In some implementations, the screen 202 may be integrally formed with the radiator guard 122, although removability of the screen 202 may be desirable, e.g., to promote maintenance of the radiator without removal of the radiator guard 122. Similarly, one or more access panels 204 may also be removably secured to the radiator guard 122. For instance, and as described further herein, one or more openings may be formed in sides of the radiator guard 122, and the access panels 204 may be bolted or otherwise secured to the radiator guard 122 to cover such openings. An operator, mechanic, or other person may remove the access panels 204 to access the radiator and/or other components for maintenance. As described herein, the radiator guard 122 is generally provided to house or otherwise surround at least a portion of the radiator and/or other parts of the tractor 100. Although the radiator guard 122 is illustrated as being used in connection with the tractor 100 and the bulldozer assembly 106, components and techniques described herein may be useful with other types of tractors, including but not-limited to non-track-type tractors, and/or with other types of implements; this disclosure is not limited to the illustrated embodiments. Reference will now be made to FIGS. 3-4 to describe the radiator guard 122 in more detail.

FIGS. 3 and 4 are front and rear perspective views, respectively, of the radiator guard 122. The radiator guard 122 generally includes a plurality of plates fixed relative to each other, e.g. by welding. More specifically, the radiator guard 122 is illustrated as including a front plate 302 and a top plate 304 angled relative to the front plate 302. The radiator guard 122 also includes a first side plate 306 and a second side plate 308 spaced laterally from each other. In the illustrated embodiment, the front plate 302 and the top plate 304 are integrally formed, e.g., connected by a radius 310, to form a unitary face plate 312. Although the front plate 302 and the top plate 304 are illustrated as being a single piece, in other implementations, the front plate 302 and the top plate 304 may be separate components joined by a fastening process, which may include the use of fasteners, welding, or other techniques. The first side plate 306 and the second side plate 308 extend generally perpendicularly from both the front plate 302 and the top plate 304, as detailed further herein.

The front plate 302 generally includes a front surface 314 and an opposite, rear surface 316 separated from the front surface 314 by a thickness of the front plate 302. Although in the illustrated embodiment the front surface 314 and the rear surface 316 are substantially parallel, e.g., such that the front plate 302 has a substantially constant thickness, the thickness may vary in other implementations. The front plate 302 also includes a first lateral side 318 and a second lateral side 320 defining the lateral extents of the front plate 302. As illustrated, the first lateral side 318 and the second lateral side 320 may be substantial mirror images of each other, e.g., about a vertical plane co-planar with the thickness of the front plate 302 and to which the front surface 314 is normal. As also illustrated, the first lateral side 318 and the second lateral side 320 may be contoured such that a width of the front plate 302 may vary at different locations on the front plate 302. More specifically, in implementations described herein, the front plate 302 may have a first lateral width, e.g., a distance between the first lateral side and the second lateral side, proximate the top plate 304, and a second lateral width further from the top plate 304, e.g., proximate a bottom edge 322 of the front plate 302. The contour of the first lateral side 318 may be formed by a first upper portion 324 proximate the top plate 304, a first lower portion 326 spaced from the top plate 304, i.e., proximate the bottom edge 322, and a first transition portion 328 extending between the first upper portion 324 and the first lower portion 326. In the illustrated embodiment, the first upper portion 324 and the first lower portion 326 are substantially parallel to each other (and perpendicular to the top plate 304 and the bottom edge 322), with the first transition portion 326 connecting the first upper portion 324 and the first lower portion 326. The second lateral side 320 may be similarly contoured, e.g., to form substantially a mirror-image of the first lateral side 318. More specifically, the second lateral side 320 may include a second upper portion 330 proximate the top plate 304, a second lower portion 332 spaced from the top plate 304, and a second transition portion 334 extending between the second upper portion 330 and the second lower portion 332. As with the first lateral side 318, the second upper portion 330 and the second lower portion 332 are substantially parallel to each other, with the second transition portion 334 being angled to connect the second upper portion 330 and the second lower portion 332.

The profiles of the first lateral side 318 and the second lateral side 320 result in the first lateral width, e.g., between the first upper portion 324 and the second upper portion 330, being greater than the second lateral width, e.g., between the first lower portion 326 and the second lower portion 332. As described further herein, this profile may assist in transferring loads from the lift cylinders 120, e.g., when the lift cylinders are mounted to the face plate 312. Although FIGS. 3 and 4 show an example profile for the first lateral side 318 and the second lateral side 320, other profiles also are contemplated. For example, the first transition portion 328 and the second transition portion 334 may be differently angled than shown. For instance, the transition portions 328, 334 may be angled relative to the respective upper portions 324, 330 by any angle up to and including 90-degrees or more. In still further examples, the lateral sides 318, 320 may be substantially linear, e.g., such that the respective upper portions 324, 330, lower portions 326, 332, and transition portions 328, 334 are colinear. In such examples, the lateral sides 318, 320 may be angled relative to the bottom edge, e.g., at an angle greater than 90-degrees, to provide a relatively shorter width of the front plate 302 proximate the bottom edge and a relatively greater width proximate the top plate 304. In some embodiments, the transition between the upper portions 324, 326, lower portions 326, 332, and/or the transition portions 328, 334 may not be as readily discernible as those illustrated, although in each example, the upper portions 324, 330 may be relatively further from each other than the lower portions 326, 332. In some alternative examples, the first lateral side 318 may have a first profile and the second lateral side 320 may have a second, different profile. Such an arrangement may result in the front plate 302 being asymmetrical, for instance.

The front plate 302 may include additional features. For example, the front plate 302 may have a front opening 336 formed therethrough. The front opening 336 may allow access through the front plate 302 to the radiator and/or other components of the tractor 100. The front opening 336 may also facilitate the flow of air into the radiator guard 122. The front opening 336 may be covered by a grill or other protective covering, which may be the screen 202 discussed above. The screen 202 may be bolted or otherwise affixed to the front plate 302 to cover the front opening 336, and appropriate mounting features may be provided for such attachment. By way of non-limiting example, FIG. 3 shows a plurality of tabs 337 spaced around the mounting openings 340. The tabs 337 may include threaded holes 339, which may be configured to receive threaded fasteners to retain the screen 202 in a position covering the front opening 336. The front opening 336 is illustrated as being generally rectangular, although other shapes may be used in different applications. The shape of the front opening 336 may be chosen to provide a maximum amount of airflow through front plate 302 while maintaining structural integrity, for example.

The front plate 302 may also include a mounting feature 338 extending partly into the front opening 336. One or more components of the tractor 100, including but not limited to one or more valves, hydraulic components, electrical components, controls, and/or the like may be conventionally disposed proximate the radiator, and the mounting feature 338 may provide a location at which such component(s) may be situated. One or more mounting openings 340 may also be formed through the mounting feature 338. For example, the mounting openings 340 may allow access to components mounted to the rear surface 316 of the front plate 302 and/or the mountings openings 340 may provide openings through which hoses, cords, wires, or the like may be passed. In the illustrated embodiment, the mounting feature 338 is a generally rectangular portion of the front plate 302 that extends into the front opening 336 proximate the first side plate 306 and the bottom edge 322. The position of the mounting feature 338 may be different, although the inventors have found that the illustrated design, in which the mounting feature 338 is situated proximate a corner of the front plate 302 may be preferable to mount components generally out of the way of the front opening 336.

As noted above, the top plate 304 may be formed integrally with the front plate 302 or, in some implementations, the top plate 304 may be separately formed and affixed to the front plate 302. As illustrated, the top plate 304 generally includes a top surface 336 and a bottom surface 338 spaced from the top surface 336 by a width of the top plate 304. The top surface 336 and the bottom surface 338 may be substantially parallel, e.g., such that the top plate 304 has a substantially constant thickness, although in other examples the thickness of the top plate 304 may vary. The top plate 304 has lateral edges 340 generally defining sides of the top plate 304, and a rear edge 342 spaced from the front plate 302. In the illustrated embodiment, the lateral edges are substantially parallel and a distance between the lateral edges 340 is substantially the same as the distance between the first upper portion 324 and the second upper portion 330 of the front plate 302. This arrangement is not required, however, as other profiles and widths also are contemplated. The top plate 304 is angled relative to the front plate 302. For instance, and as best illustrated in FIG. 1, the top plate 304 is angled by about 120-degrees relative to the front plate 302, although the disclosure is not limited to this angle. Any angle may be used, including from about 75-degrees or less to about 150-degrees or more.

The first side plate 306 and the second side plate 308 are affixed, e.g., by welding, to the front plate 302 and the top plate 304. Specifically, the first side plate 306 is generally disposed proximate the first lateral side 318 of the front plate 302 and the second side plate 308 is generally disposed proximate the second lateral side 320 of the front plate 302. As illustrated, the first side plate 306 has a first outer surface 350 and a first inner surface 352 spaced from the first outer surface 350 by a first side plate thickness. Similarly, the second side plate 308 has a second outer surface 354 and a second inner surface 356 spaced from the second outer surface 354 by a second side plate thickness. The first side plate 306 and the second side plate 308 may have generally equal thicknesses and/or each may have a uniform thickness. As illustrated, the first side plate 306 and the second side plate 308 are attached to the front plate 302 and the bottom surface 344 of the top plate 304. In some implementations, the side plates 306, 308 may extend substantially perpendicularly from both the rear surface 316 of the front plate 302 and the bottom surface 344 of the top plate 304, although they may depend at an angle other than 90-degrees in some implementations.

In some examples, the first side plate 306 is disposed generally proximate the first lateral side 318 and the second side plate 308 is disposed generally proximate the second lateral side 320. More specifically, the first inner surface 352 and the second inner surface 356 are disposed to face each other, and accordingly, the inner surfaces 352, 356, the rear surface 316 of the front plate 302, and the bottom surface 344 of the top plate 304 define an opening in which a portion of a radiator (not shown) may be disposed. Because of the profiles of the front plate 302, e.g., because the first lateral side 318 and the second lateral side 320 have the varied lateral widths, as discussed above, the first upper portion 324 and the second upper portion 330 extend laterally outwardly from the first outer surface 350 and the second outer surface 354, respectively. In contrast, the first lower portion 326 and the second lower portion 332 may be substantially aligned with the first outer surface 350 and the second outer surface 354, respectively. In some implementations, the first lower portion 326 may be substantially flush with the first outer surface 350 and/or the second lower portion 332 may be substantially flush with the second outer surface 354. In other implementations, the first lower portion 326 may be offset relative to the first outer surface and/or the second lower portion 332 may be offset relative to the second outer surface 354, e.g., to facilitate welding of the respective side plates 306, 308 to the rear surface 316 of the front plate 304, e.g. at the outer surface 350, 354.

As also illustrated in FIG. 3, each of the first side plate 306 and the second side plate 308 may have a side plate cutout 358. The side plate cutouts 358 may provide access to the volume defined by the radiator guard 122, e.g., to access the radiator and/or other components for maintenance, replacement, repair, or the like. As discussed above in connection with FIG. 2, the access panels 204 may be sized to cover (and in some instances, substantially seal) the side plate cutouts 358 and may be removable to access the side plate cutouts 358. For example, the access panels 204 may be bolted, latched, pinned, or otherwise removably retained over the side plate cutouts 358.

In the illustrated embodiments, the first side plate 306 and the second side plate 308 are substantially identical, although they may vary in other implementations. For example, only one of the side plates 306, 308 may have the cutout 358 and/or the sides plates 306, 308 may have differently sized or shaped cutouts 358. Moreover, depending upon the implementation, different components, e.g., electrical components, hydraulic components, or the like may be mounted to the side plates 306, 308 and the side plates 306, 308 may vary to support those components.

As noted above and described further herein, the radiator guard 122 is attached to the tractor 100. In some implementations, the radiator guard 122 may be fixed to the tractor 100, e.g., using welding, riveting or other fastening techniques. In other implementations, the radiator guard 122 may be removably secured to the tractor 100. For example, the radiator guard 122 may be bolted, pinned, or otherwise secured to the tractor 100 in a manner that allows for removal of the radiator guard 122. In still further implementations, including the illustrated implementation, the radiator guard may be affixed to the tractor 100 in a manner that allows the radiator guard 122 to move relative to the remainder of the tractor 100, while keeping the radiator guard 122 fixed to the tractor 100. More specifically, the first side plate 306 and the second side plate 308 are illustrated as including pivot receptacles 360 that are configured to receive and retain pivots (not shown). In some implementations, the pivots may be protrusions that extend from the outer surfaces 350, 354 and are configured to be received in and retained by a cooperating socket or receptacle (not shown) on the tractor 100. In this manner, the radiator guard 122 may be pivotable relative to the tractor 100 about the pivots from a closed position in which the radiator guard 122 covers the radiator and other components and an open position in which access is provided to the radiator and other components. The closed position is illustrated in FIG. 1 and FIG. 2, and in the open position, the radiator guard 122 may be tipped forward about the pivots, e.g., toward the blade 108.

To facilitate retaining the radiator guard 122 in the closed position, the side plates 306, 308 may also include one or more pin receptacles 362. The pin receptacles 362 may be holes or openings formed through the side plates 306, 308 and sized to receive a shaft of a pin (not shown) therethrough. For example, in the closed position, each of the pin receptacles 362 may align with an additional opening in the frame of the vehicle 100 and the pin may be passed through one of the pin receptacles 362 and the aligned additional opening. In some implementations, the additional openings may be threaded openings, and a distal end of the pin may be threaded for engaging the threaded opening. In other implementations, the additional openings may also be configured for the shaft of the pin to pass through. For example, the pin may be a cotter pin, dowel pin, or other mechanical pin configured to maintain alignment of the pin receptacles 362 and the additional openings, and therefore, alignment of the radiator guard 122 and the tractor 100. In other implementations, the pin receptacles 362 may be configured as other than a through hole, as illustrated. For example, the pin receptacles 362 may be configured as slots, which may be open slots extending to a bottom edge of the sides 306, 308, for example.

The radiator guard 122 may also include additional features for retaining the radiator guard 122 in place on the tractor 100 and/or for mounting additional features to the radiator guard 122. For example, FIG. 3 also illustrates mounting fingers 364 disposed on a bottom surface 344 of the top plate 304 and extending past the rear edge 348 in a direction away from the front plate 302. In the illustrated examples, the mounting fingers 364 may include a plurality of protrusions 366 that act to catch or otherwise engage a portion of a hood (not shown) of the tractor 100. For example, the protrusions 366 may capture a post or other protrusion of the hood herebetween. In still further examples, the post and/or the fingers 364 may be otherwise movable to facilitate engagement. For example, the post may be retractable and/or the finger may pivot about a pivot point, e.g., under the top plate 304. As will be appreciated, additional and/or alternative mechanisms may be used to retain other features on the radiator guard 122 and/or to retain the radiator guard 122 in place on the tractor 100.

The radiator guard 122 may also include a plurality of gussets. For instance, FIG. 3 illustrates an outer gusset 368 that is configured to contact the rear surface 316 of the front plate 302, the bottom surface 344 of the top plate 304 and the first outer surface 350 of the first side plate 306. Although not illustrated, another outer gusset 368 may be provided to contact the rear surface 316 of the front plate 302, the bottom surface 344 of the top plate 304, and the second outer surface 354 of the second side plate 308. The outer gussets 368 are generally disposed to provide support to the front plate 302 and/or the top plate 304, e.g., to counteract loads from the lift cylinders, as described further herein. The outer gussets will also be discussed further below, in connection with FIG. 4.

As also illustrated in FIG. 3, the radiator guard 122 may also include two yoke assemblies 370 which are generally provided for receiving and retaining the lift cylinders 120. Each of the yoke assemblies 370 is mounted at a position proximate the intersection of the front plate 302 and the top plate 304, e.g., at the radius 310 in FIG. 3. For instance, each yoke assembly 370 is illustrated as being disposed on two spaced-apart mounting brackets 372 proximate the lateral sides 318, 320 of the front plate 302 and the lateral edges 346 of the top plate 304. Each of the mounting brackets 372 is generally Y-shaped and includes a base portion 374 having a first leg 376 and a second leg 378. Th first leg 376 is configured to contact the top surface 342 of the top plate 304 and the second leg 378 is configured to contact the front surface 314 of the front plate 302. Each of the mounting brackets 372 also includes an arm 380 extending generally from the intersection of the first leg 376 and the second leg 378. The arm 380 may have a substantially planar upper mounting surface 382 on which the yoke assemblies 370 are mounted. In implementations of this disclosure, the mounting brackets 372 may be welded to the front plate 302 and the top plate 304 although in other examples different fastening means also are contemplated. For instance, the mounting brackets 372 may be bolted. Moreover, a combination of attachment techniques may be used.

As shown, the mounting brackets 372 are arranged proximate the junction of the front plate 302 and the top plate 304. In this manner, the yoke assemblies 370 are positioned generally in front of the front surface 314 of the front plate 302 and/or above the top surface 342. Accordingly, the yoke assemblies 370 are positioned to keep the lift cylinders spaced from the front plate 302. Moreover, the mounting brackets 372 are arranged at the lateral edges of the front plate 302, such that the yoke assemblies 370 maintain a lateral distance between the lift cylinders 120. The lateral distance may be beneficial to balance the weight of the blade 108 and/or to allow access to the front opening 336, e.g. between the lift cylinders 120. According to implementations described herein, the generally wider distance between the first upper portion 324 of the first lateral side 318 and the second upper portion 330 of the second lateral side 320 may facilitate the spacing between the yoke assemblies 370 (and thus the lift cylinders 120). In examples, the lift cylinders 120 may be spaced substantially as wide as or wider than the width between the first lower portion 324 of the first lateral side 318 and the second lower portion 332 of the second lateral side 320.

Other features may also be included on the radiator guard 122. For example, and without limitation, the radiator guard 122 may also include a secondary plate 382. The secondary plate 382 illustrated in FIG. 3 is substantially L-shaped, having a vertical portion 384 and a horizontal portion 386 angled relative to the vertical portion 384. Although in the illustration the vertical portion 384 is angled by about 90-degrees relative to the horizontal portion 386, the angle may vary in other implementations. The secondary plate 382 extends generally between the first side plate 306 and the second side plate 308, a first distal edge (not visible in FIG. 3) of the vertical portion 384 of the secondary plate 382 contacts the bottom surface 344 of the top plate 302, and a second distal edge (not visible in FIG. 3) of the horizontal portion 386 contacts a rear surface 316 of the front plate 302. The secondary plate 382 may be to the front plate 302, the top plate 304, and/or the side plates 306, 308 using conventional fastening means, including welding, bolting, or the like. In some implementations, the secondary plate 382 may provide additional structural rigidity to the radiator guard 122. Moreover, one or more surfaces of the secondary plate 382 may provide one or more mounting surfaces upon which components may be secured. For example, a tab 388, like the tabs 337 discussed above, may be provided for attachment of the screen 202. The tab 388 may include one or more threaded holes 390 for receiving a threaded fastener to facilitate attachment of the screen 202. Of course, the tab 388 with threaded holes 390 is only one example; other examples also are contemplated.

A cutout 392 may be formed through the vertical portion 384 of the secondary plate 382. For example, the cutout 392 may provide access to the radiator and/or other components housed by the radiator guard 122, e.g., when the screen 202 is removed. The cutout 392 may substantially align with the front opening 336 of the front plate 302. In some implementations, portions of the radiator, including the radiator fan, for example, and/or other components may be circumscribed by the cutout 392. Moreover, although the cutout 392 is illustrated as being generally round, other shapes and/or sizes may be used, instead. Moreover, additional cutouts 394 also may be formed through the second plate 382. The additional cutouts 394 may be provided through either of the vertical portion 384 or the horizontal portion 386. Without limitation, the additional cutouts 394 may provide access to components of the tractor 100, may comprise a passthrough for electrical wires, hydraulic lines, or other control components, or the like.

As described, the radiator guard 122 may include many benefits over previous radiator guards. For example, and without limitation, the profile of the front plate 302, together with the top plate 304 and the outer gussets 368 may provide sufficient strength to support the lift cylinders 120. This arrangement is different from conventional designs, which have required that a cast yoke assembly be inserted into and retained in sleeve-like opening. Unlike those conventional designs, implementations described herein do not require routine greasing and other maintenance, and are more readily repaired and/or replaced. Moreover, manufacturability of the radiator guard 122 may be cheaper and/or quicker than conventional radiator guard assemblies.

FIG. 4 is a rear perspective view of the radiator guard 122 shown in FIG. 3. FIG. 4 better illustrates some components discussed above, and shows some additional components.

For example, FIG. 4 illustrates the outer gusset 368 that is not visible in FIG. 3, i.e., the outer gusset 368 affixed to the second side plate 308. FIG. 4 illustrates this outer gusset 368 in more detail. In some implementations, the outer gussets 368 affixed to the first side plate 306 and to the second side plate 308 are substantial mirror images of each other, and thus the following description may apply to both outer gussets 368. More specifically, the outer gusset 368 generally including a gusset plate 402 having a first portion 404 angled relative to a second portion 406. In the illustrated implementation, the gusset plate 402 may comprise a continuous, generally rectangular plate in which the first portion 404 is bent relative to the second portion 406 about a radius 408. The angle between the first portion 404 and the second portion 406 may be substantially the same as the angle at which the second transition portion 334 is angled relative to the second upper portion 330. In other implementations, the first portion 404 and the second portion 406 may be differently angled, including from about 90-degrees or less to about 150-degrees or more. Although the gusset plate 402 is illustrated as a continuous plate, in other implementations, the first portion 404 and the second portion 406 may be formed separately and secured to each other, e.g., via welding, fasteners, or other techniques.

The outer gusset 368 is secured to the radiator guard 122 such that the first portion 404 extends generally parallel to the second upper portion 330, e.g., substantially vertically. In this orientation, a top edge 410, e.g., a distal end of the first portion 404, is arranged to contact the bottom surface 344 of the top plate 304, and a bottom edge 412, e.g., a distal end of the second portion 406, is arranged to contact the second outer surface 354. A first lateral edge 414 contacts the rear surface 316 of the front plate 302 and a second lateral edge 416 is spaced from the rear surface 316. The gusset plate 402 may be welded to the front plate 302, the top plate 304 and/or the second side plate 308. In some implementations, the described and illustrated arrangement of the components may facilitate fillet welding, for example, although other fastening techniques may also or alternatively be used.

As also illustrated in FIG. 4, the outer gusset 368 may include a rear plate 420. The rear plate 420 is illustrated as a generally trapezoidal plate configured for securing to the bottom surface 344 of the top plate 304, the rear surface 316 of the front plate 302 and the second lateral edge 416 of the gusset plate. The rear plate 418 may function as a cap that covers an opening between the bottom surface 344 of the top plate, the rear surface 316 of the front plate 302 and the gusset plate 402, and the shape of the rear plate 418 may be dictated by the shape of such opening. In other implementations, however, the rear plate 418 may be differently shaped. The rear plate 418 may also provide structural rigidity to the radiator assembly 122. The rear plate 418 may be omitted in other implementations, e.g., to expose the opening defined by the bottom surface 344, the rear surface 316 and the gusset plate 402.

As will be appreciated, the illustrated shape of the outer gusset 368 is for example only and may vary in other examples. For instance, in some implementations the gusset plate 402 may be substantially planar, e.g., without the radius 408. Accordingly, the gusset plate 402 may be substantially rectangular in shape, with the first portion 404 and the second portion 406 being co-planar. In this example, the rear plate 418 may be substantially triangular, for example. In still other implementations, the gusset plate 402 may extend from the rear surface 334 of the front plate 302 at other than about 90-degrees. For example, the gusset plate 402 may be substantially triangular in shape such that a first corner of the triangular shape is disposed at an intersection between the second outer surface 354 and the bottom surface 344, a second corner of the triangular shape is disposed at an intersection between the second outer surface and the rear surface 316, and the third corner of the triangular shape is disposed at an intersection of the bottom surface 344 and the rear surface 316, spaced from the outer surface 354. Such an arrangement could result in a single plate providing the gusset 368, and thus could obviate the need for the rear plate 418. Other modifications to the outer gusset 368 may also be appreciated by those having ordinary skill in the art with the benefit of this disclosure.

FIG. 4 also illustrates an inner gusset 420 contacting the first inner surface 352, the bottom surface 344, and the rear surface 316. The inner gusset 420 may be substantially identical to the outer gusset 368, and, although not illustrated, another inner gusset may also be provided on the second inner surface 356. Thus, in FIG. 4, the illustrated inner gusset may be substantially identical to the illustrated outer gusset 368, and the illustrated inner gusset may be substantially a mirror-image of the outer gusset 368 shown in FIG. 3. As illustrated, the inner gusset 420 may include a gusset plate 422, which may be substantially the same as the gusset plate 402. Unlike the outer gusset 368, however, the gusset plate 422 of the inner gusset 420 may contact the secondary plate 382, which could obviate the need for a rear plate, like the rear plate 418.

Figure 5:
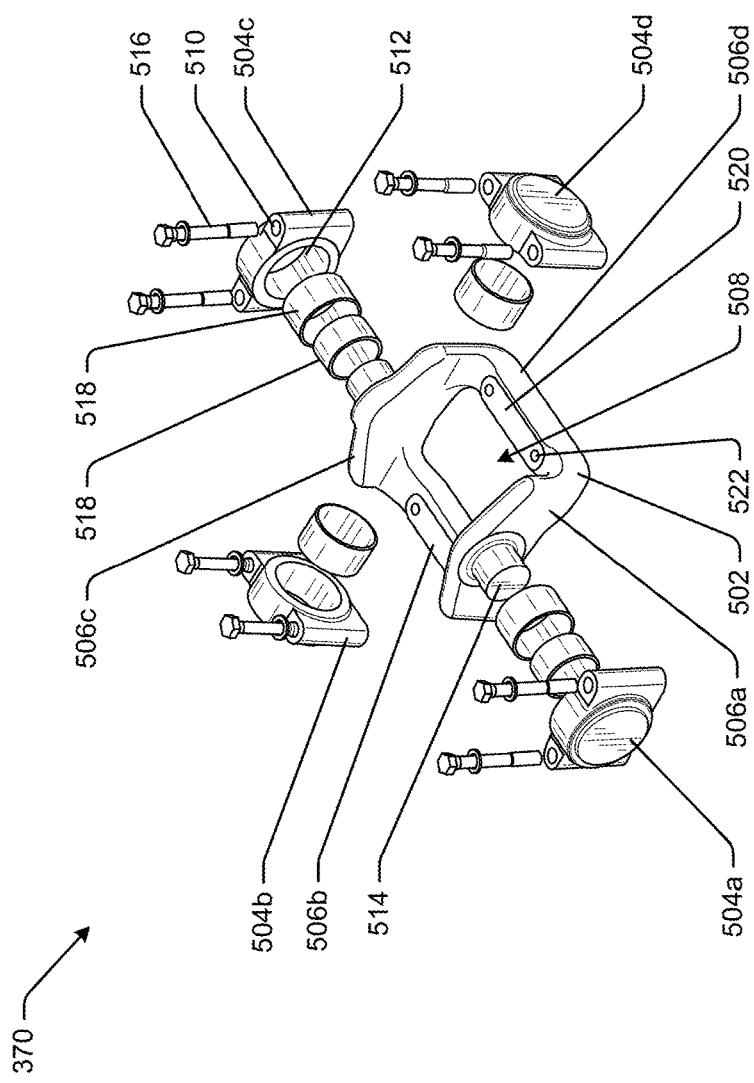
FIG. 5 is an exploded perspective view of a yoke assembly, in accordance with an example embodiment of the present disclosure.

FIG. 5 is an exploded perspective view of the yoke assembly 370. The yoke assembly 370 generally includes a collar 502 and a plurality of receptacle mounts 504a, 504b, 504c, 504d (collectively, the "receptacle mounts 504"). More specifically, the collar 502 has a continuous outer periphery generally including four sides 506a, 506b, 506c, 506d (collectively, the "sides 506") defining an opening 508. Although the four sides 506 are illustrated as generally linear, making the opening 508 generally square-shaped, in other embodiments the collar may be differently shaped. For example, the collar 502 may be configured such that the opening 508 is more rounded. In the illustrated example, the collar 502 is a unitary piece, which may be cast, forged or made according to other manufacturing processes. In other embodiments, the collar 502 may be formed from two or more pieces that may be assembled after manufacture. The opening 508 is sized to be positioned around, e.g., to circumscribe, an outer surface of one of the lift cylinders 120. In the illustrated example, the lift cylinder 120 may be passed through the opening 508. As noted above, in other implementations the collar 502 may be formed from two or more pieces, and such a multiple-piece design may facilitate easier placement of the collar 502 around the lift cylinder 120.

In the illustrated example, each of the receptacle mounts 504 is substantially the same, and includes two mounting holes 510 (although more or fewer mounting holes could be provided) and a receptacle 512. The receptacle 512 is illustrated as a cylindrical bore or blind hole formed in the receptacle mounts 504, although in other examples the receptacles 512 may be through holes. The receptacle mounts 504 are generally provided to secure the lift cylinder 120 to the tractor 100. More specifically, first opposing receptacle mounts, e.g., the receptacle mounts 504a, 504c, are configured to retain the collar 502 on the radiator guard 122 and second opposing receptacle mounts, e.g. the receptacle mounts 504b, 504d, are configured to retain the lift cylinder 120 in the collar 502.

To facilitate attachment of the collar 502 to the radiator guard, a boss 514 or other protrusion may be formed on one or more outer surfaces of the collar 502. For example, the side 506a and an opposite side 506c are illustrated as including the boss 514. Each boss 514 is configured to be received in one of the receptacles 512. In FIG. 5, the boss 514 formed on the side 506a is configured to be received in the receptacle 512 of the receptacle mount 504a and the boss 514 formed on the side 506c is configured to be received in the receptacle 512 of the receptacle mount 504c. The boss 514 and the receptacle 512 are sized such that the boss 514 is received in the receptacle in a manner that allows the boss 514 to rotate relative to the receptacle, e.g., about an axis of the receptacle 512. The bosses 514 and the receptacles 512 are substantially coaxial. Accordingly, when the receptacle mounts 504a, 504c are fixed to the mounting brackets 372, e.g., using bolts 516, the collar is free to rotate about the axes of the bosses 514, relative to the receptacle mounts 504a, 504c. One or more bushings 518 or the like may also be disposed in the receptacles 512, e.g., to promote and/or ease rotation of the boss 514 in the receptacle 512.

The opposing receptacle mounts 504b, 504d are fixed to the collar 502. For example, each of the opposite sides 506b, 506d of the collar 502 may include a mounting surface 520. In the illustrated example, each mounting surface 520 includes two threaded mounting holes 522 (although the number and the arrangement of the mounting holes 522 may be different). Each of the opposing receptacle mounts 504b, 504d may be fixed on a respective mounting surface 520, e.g., using the bolts 516. Of course, mounting of the receptacle mounts 504 is not limited to bolts 516 or to any other fasteners. Once assembled, the receptacles 512 of the opposing receptacle mounts 504b, 504d may be substantially aligned, e.g., coaxial. Although not illustrated, these receptacles 512 are configured to retain bosses or other protrusions formed on an outer surface of the lift cylinder 120. Additional bushings 518 may also be provided in the receptacles 512.

As noted above, the yoke assembly 370 shown in FIG. 5 allows for rotation of the collar 302 about an axis of the bosses 514 and allows for rotation of the lift cylinder 120 about an axis of the receptacles 512 of the receptacle mounts 504b, 504d. Thus, the yoke assembly 370 allows for some movement of the lift cylinder relative to the tractor 100, which may be important as the lift cylinder 120 is engaged to raise and lower the blade 108. Moreover, unlike conventional designs, the yoke assembly 370 is entirely external of the radiator guard 122, thereby requiring less maintenance, easier manufacture, and/or more convenient assembly, disassembly, and/or repair. For example, because each of the receptacle mounts 304 is the same in the illustrated embodiment and is mounted via the bolts 516, should one of the bearings 518 or the receptacle mounts 304 fail, a replacement can be done readily.

Figure 6:
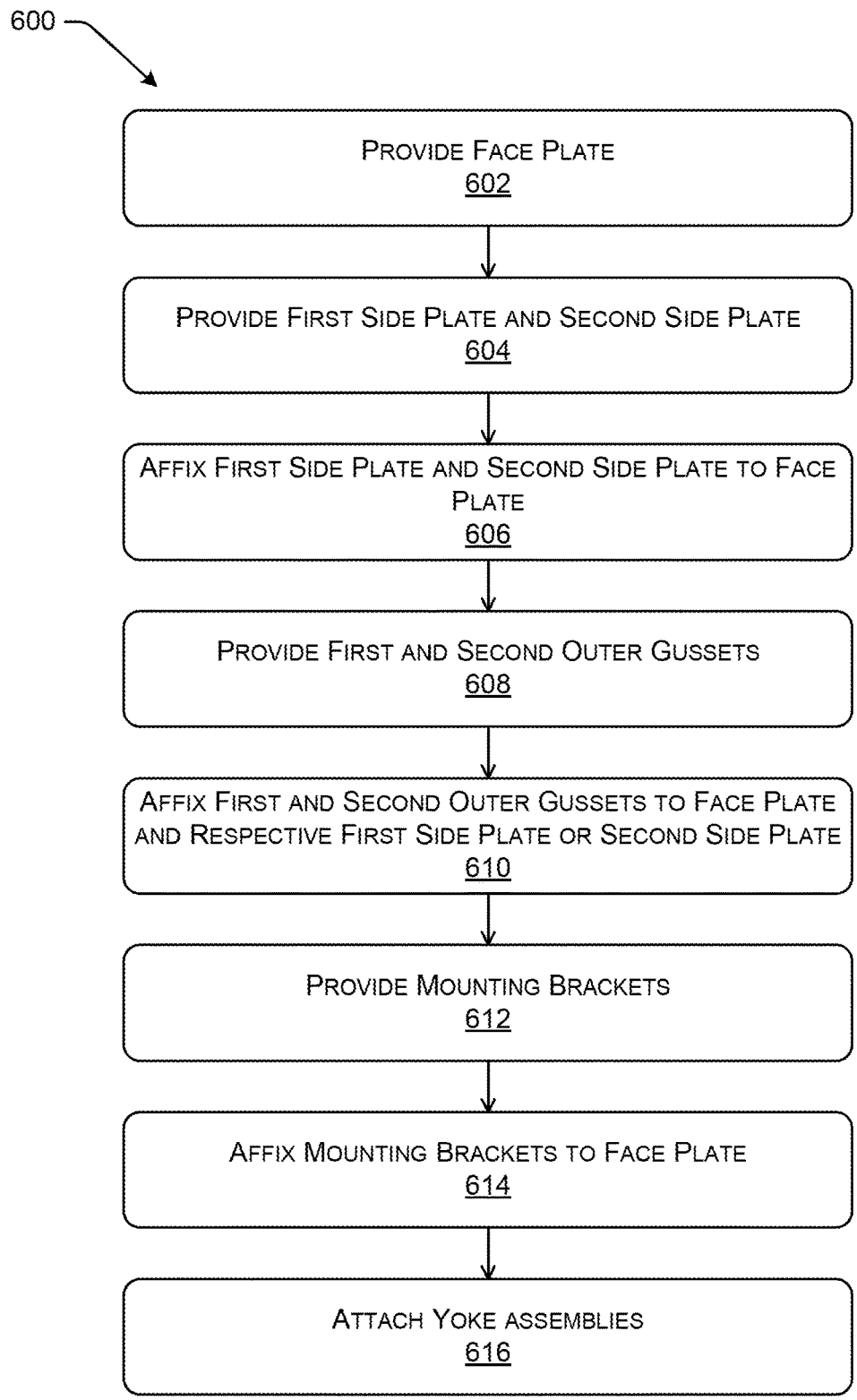
FIG. 6 is a flowchart illustrating a method of manufacturing a radiator guard, in accordance with an example embodiment of the present disclosure.

FIG. 6 illustrates an example method 600 of manufacturing the radiator guard 122. As discussed further herein, the radiator guard 122 may be simpler and more cost effective to produce than conventional designs, and the method 600 shows some example steps for achieving such benefits.

Specifically, at 602, the method 600 includes providing a face plate. As described herein, the face plate 312 may be a unitary plate that includes both the front plate 302 and the top plate 304. For example, the face plate 312 may be formed by bending a continuous plate about the radius 310 to form a bend of from about 90-degrees to about 135-degrees separating the front plate 302 from the top plate 304. The front plate 302 may be defined by the lateral sides 318, 320, which have a profile that creates a relatively wider width proximate the top plate 304 than proximate the bottom edge of the front plate, spaced from the top plate 304. The front plate may be fabricated with any of the features illustrated and/or discussed herein, including the front opening 336, the mounting feature 338, the mounting openings 340, or the like. Although the face plate 312 is shown as a unitary piece including the front plate 302 and the top plate 304, in other example implementations, the face plate 312 may include two or more plates joined prior to 602.

At 604, the method 600 includes providing a first side plate and a second side plate. For example, the first side plate 306 and the second side plate 308 are illustrated in FIGS. 3 and 4. The side plates 306, 308 may include the side plate cutouts 358 and/or other features discussed and illustrated herein.

At 606, the method 600 includes affixing the first side plate and the second side plate to the face plate. For example, the first side plate 306 may be affixed to both the rear surface 316 of the front plate 302 of the face plate 312 and to the bottom surface 344 of the top plate 304 of the face plate 312 proximate the first lateral edge 318 of the front plate 302. Similarly, the second side plate 308 may be affixed to the rear surface 316 and the bottom surface 344 proximate the second lateral edge 320. In implementations, 606 may include placing the front plate 302 face down on a work surface, maintaining the first side plate 306 and/or the second side plate 308 at a position generally normal to the rear surface 316 of the front plate 302 and welding the first side plate 306 and/or the second side plate 308 in place, e.g., using fillet welds at the edges of the side plates 306, 308 that contact the front plate 302 or the top plate 304. To this end, the first side plate 306 and the second side plate 308 may include an outer shape that matches a contour created by the front plate 302 and the top plate 304.

At 608, the method 600 can include providing first and second outer gussets. For example, the first and second outer gussets may be the outer gussets 368 shown in detail in, and discussed with reference to, FIG. 4.

At 610, the method 600 can include affixing the outer gussets to the face plate and the respective first side plate or second side plate. For example, the side plates 306, 308 may be positioned such that the first upper portion 324 and the second upper portion 330 extend laterally outward of the first outer surface 350 and the second outer surface 354, respectively, and the outer gussets 368 may be affixed to the rear surface 316 at this laterally-extending portion. For example, each of the outer gussets 368 may include the first portion 404 and the second portion 406 and may be affixed such that the top edge 410 contacts the bottom surface 344 of the top plate 304 and the bottom edge 412 contacts the outer surface 350, 354 of the respective side plate 306, 308. Again, with the face plate situated face down on the work surface, the gusset plates 402 of the outer gussets 368 may be readily welded, e.g., fillet welded, into place. In some implementations, the rear plate 418 may also be provided, and welded to the gusset plate 402 and/or the respective side plate 306, 308.

At 612, the method can also include providing mounting brackets. For example, the mounting brackets may be the mounting brackets 372, shown in detail in, and discussed with reference to FIG. 3.

At 614, the method 600 can also include affixing the mounting brackets to the face plate. As noted above, the side plates 306, 308 and the outer gussets 368 may be welded with the face plate 302 arranged face down. In some instances, the secondary plate 382 and the inner gussets 420 may also be welded with the face plate 302 face down. At 614, the front surface 314 of the face plate may be exposed, e.g., by turning the assembly so the front surface 314 is face up, the mounting brackets 372 may be welded to the front surface 314 and the top surface 342, as discussed above.

At 616, the method 600 may also include attaching the yoke assemblies. For example, two mounting brackets 372 may be provided proximate the first lateral side 318 of the face plate 312 to mount a first yoke assembly 370 and two mounting brackets 372 may be provided proximate the second later side 320 to mount a second yoke assembly 370. As illustrated in FIG. 5, the yoke assemblies may be bolted to the mounting brackets 372.

Although not explicitly illustrated in FIG. 6, the method 600 may also include steps of providing and affixing additional components to the radiator guard 122. By way of non-limiting example, the inner gussets 420 and/or the secondary plate 382 also may be a part of the radiator guard 122, and can be added in a manner similar to the features discussed above. For instance, the inner gussets 420 may be affixed to the front plate 302, the top plate 304, and the respective side plate 306, 308 proximate the time when the outer gussets 376 are affixed. Moreover, the second plate 382 may be affixed after the inner gussets 420, e.g., because the secondary plate 382 may be affixed at least in part to the inner gussets 420. As will be appreciated, the inner gussets 420 and/or the secondary plate may be affixed with the face plate 310 in the face-down position described above. Welding, such as fillet welding, may also be used to affix these additional features.

The method 600 allows for improved efficiency when manufacturing a radiator guard. For instance, because the face plate 312, the side plates 306, 308, the gussets 368, and the mounting brackets 372 can be made from conventional plate stock, the cost to manufacture the components may be less than in previous methods in which expensive forged and/or cast components are required. Similarly, the majority of the components can be affixed using conventional welding techniques, including fillet welding, with minimal or no additional tooling.

INDUSTRIAL APPLICABILITY

The present disclosure provides an improved radiator guard and methods of making the radiator guard. The radiator guard may be used on a variety of machines. For example, the radiator guard may be used on track-type tractors, trackless tractors, or other machines. The radiator guard may be particularly useful on machines that include lift cylinders disposed proximate the radiator guard, e.g., to move a tool or implement. The disclosed radiator guard may result in a more desirable lift cylinder mounting arrangement, may be more cost effective than previous designs and/or may reduce maintenance time and expense. Moreover, the manufacturing methods described herein may result in a decrease in both manufacturing time and manufacturing cost.

According to some embodiments, a radiator guard 122 may include a number of plates configured to mount a plurality of yoke assemblies 370 that do not require insertion into the radiator guard. Thus, for example, the radiator guard 122 may be formed from the plates, instead of castings, which may be more expensive and/or time consuming to manufacture. Moreover, when such castings fail, repair is generally not an option; the entire radiator guard must be replaced. In contrast, the yoke assembly 370 of the disclosed radiator guard 122 is readily remove, replace, and repaired, as described further herein.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof

What is claimed is:

1. A radiator guard for a machine, the radiator guard comprising:
    a front plate comprising a front face and a rear face spaced from the front face, the front plate extending between a first lateral side and a second lateral side, a first lateral width comprising a first distance between the first lateral side and the second lateral side proximate a top of the front plate being greater than a second lateral width comprising a second distance between the first lateral side and the second lateral side proximate a bottom of the front plate;
    a top plate angled relative to the front plate and fixed relative to the front plate proximate the top of the front plate, the top plate comprising a top surface and a bottom surface spaced from the top surface;
    a first side plate fixed to the rear face of the front plate and to the bottom surface of the top plate, the first side plate relatively nearer the first lateral side and having a first outer surface;
    a second side plate fixed to the rear face of the front plate and to the bottom surface of the top plate, the second side plate relatively nearer the second lateral side than the first side plate and having a second outer surface;
    a first gusset affixed to the rear face of the front plate, the bottom surface of the top plate, and the first outer surface of the first side plate;
    a second gusset affixed to the rear face of the front plate, the bottom surface of the top plate, and the second outer surface of the second side plate;
    a first cylinder yoke assembly proximate the first lateral side and the top of the front plate and configured to retain a first lift cylinder; and
    a second cylinder yoke assembly arranged proximate the second lateral side and the top of the front plate and configured to retain a second lift cylinder.

2. The radiator guard of claim 1, further comprising:
    at least one first bracket secured to the front face of the front plate and to the top surface of the top plate and configured to support the first cylinder yoke assembly; and
    at least one second bracket secured to the front face of the front plate and the top surface of the top plate configured to support the second cylinder yoke assembly.

3. The radiator guard of claim 2, wherein one or more of the at least one first bracket or the at least one second bracket comprises at least a base portion configured to be secured to the front face of the front plate and to the top surface of the top plate and an arm extending from the base, at least a portion of the first yoke assembly or the second yoke assembly being mounted on the arm.

4. The radiator guard of claim 3, wherein the first cylinder yoke assembly or the second cylinder yoke assembly includes a collar configured to circumscribe an outer surface of the cylinder and opposing receptacle mounts affixed to the collar, the opposing receptacle mounts including openings configured to retain therein protrusions extending from the outer surface of the cylinder.

5. The radiator guard of claim 1, wherein at least one of the first lateral side or the second lateral side comprises a bottom portion proximate the bottom of the front plate, a top portion proximate the top plate and substantially parallel to the first portion, and a transition portion angled relative to the bottom portion and the top portion.

6. The radiator guard of claim 1, further comprising:
a first opening formed through the front plate; and
at least one second opening formed through the first side plate or the second side plate.

7. The radiator guard of claim 1, wherein the top plate and the front plate comprise a contiguous structure in which a top plate portion comprising the top plate is bent relative to a front plate portion comprising the front plate.

8. The radiator guard of claim 1, wherein the first portion is bent relative to the second portion by an angle of between about 90-degrees and about 135-degrees.

9. The radiator guard of claim 1, further comprising at least one of a third gusset affixed to the rear face of the front plate, the bottom surface of the top plate, and the first inner surface of the first side plate or a fourth gusset affixed to the rear face of the front plate, the bottom surface of the top plate, and the second inner surface of the second side plate.

10. The radiator guard of claim 1, wherein the first gusset or the second gusset comprises a gusset plate comprising a first portion angled relative to a second portion, a first edge comprising a portion of the first portion and the second portion, a top edge at a distal end of the first portion and a bottom edge at a distal end of the second portion, the first edge being affixed to the first outer surface or the second outer surface, the top edge being affixed to the bottom surface of the top plate, and the bottom edge being affixed to the rear face of the front plate.

11. The radiator guard of claim 1, further comprising:
an opening formed through at least one of the first side plate or the second side plate; and
an access panel selectively movable between a first position covering the opening and a second position exposing the opening.

12. The radiator guard of claim 11, wherein the opening is configured to allow access to one or more components disposed in a volume defined at least in part by one or more of the front plate, the top plate, the first side plate, or the second side plate.

13. A tractor comprising:
a frame;
a radiator disposed on the frame;
a bulldozer assembly comprising a blade, a first lift cylinder, and a second lift cylinder, the first lift cylinder and the second lift cylinder being configured to selectively raise and lower the blade relative to the frame; and
a radiator guard at least partially surrounding the radiator, the radiator guard comprising:
a face plate comprising a front plate portion and a top plate portion angled relative to the front plate portion, the front plate extending between a first lateral side and a second lateral side, a first lateral width comprising a first distance between the first lateral side and the second lateral side proximate the top plate portion being greater than a second lateral width comprising a second distance between the first lateral side and the second lateral side proximate a bottom of the front plate;
a first side plate fixed to a rear face of the front plate portion and to a bottom surface of the top plate portion, the first side plate relatively nearer the first lateral side and having a first outer surface;
a second side plate fixed to the rear face of the front plate and to the bottom surface of the top plate, the second side plate relatively nearer the second lateral side than the first side plate;
a first gusset affixed to the rear face of the front plate, the bottom surface of the top plate, and the first outer surface of the first side plate;
a second gusset affixed to the rear face of the front plate, the bottom surface of the top plate, and the second outer surface of the second side plate;
a first cylinder yoke arranged proximate the first lateral side and the top of the front plate and configured to support the first piston; and
a second cylinder yoke arranged proximate the second lateral side and the top of the front plate and configured to support the second piston.

14. The tractor of claim 13, further comprising:
at least one first bracket secured to the front face of the front plate and to the top surface of the top plate and configured to support the first cylinder yoke assembly; and
at least one second bracket secured to the front face of the front plate and the top surface of the top plate configured to support the second cylinder yoke assembly.

15. The tractor of claim 14, wherein one or more of the at least one first bracket or the at least one second bracket comprises at least a base portion configured to be secured to the front face of the front plate and to the top surface of the top plate and an arm extending from the base, at least a portion of the first yoke assembly or the second yoke assembly being mounted on the arm.

16. The tractor of claim 15, wherein the first cylinder yoke assembly or the second cylinder yoke assembly includes a collar configured to circumscribe an outer surface of the cylinder and opposing receptacle mounts affixed to the collar, the opposing receptacle mounts including openings configured to retain therein protrusions extending from the outer surface of the cylinder.

17. The tractor of claim 13, wherein at least one of the first lateral side or the second lateral side comprises a bottom portion proximate the bottom of the front plate, a top portion proximate the top plate and substantially parallel to the first portion, and a transition portion angled relative to the bottom portion and the top portion.

18. The tractor of claim 13, wherein the first gusset or the second gusset comprises a gusset plate comprising a first portion angled relative to a second portion, a first edge comprising a portion of the first portion and the second portion, a top edge at a distal end of the first portion and a bottom edge at a distal end of the second portion, the first edge being affixed to the first outer surface or the second outer surface, the top edge being affixed to the bottom surface of the top plate, and the bottom edge being affixed to the rear face of the front plate.

19. The tractor of claim 13, further comprising at least one pivot at which the radiator guard is attached to a frame of the tractor, the radiator guard being pivotable relative to the frame of the tractor about the pivot.

20. The tractor of claim 13, wherein at least one of the first side plate or the second side plate further includes an access opening formed through the at least one of the first side plate or the second side plate, the tractor further comprising:
an access panel selectively moveable between a first position covering the opening and a second position exposing the opening.

21. A method of manufacturing a radiator guard, the method comprising:
providing a face plate, the face plate comprising a front plate portion and a top plate portion angled relative to the front plate portion, the front plate portion comprising a front face and a rear face spaced from the front face, the front face extending between a first lateral side and a second lateral side, a first lateral width comprising a first distance between the first lateral side and the second lateral side proximate the top plate portion being greater than a second lateral width comprising a second distance between the first lateral side and the second lateral side proximate a bottom of the front plate;
providing a first side plate, the first side plate having a first outer surface, a first inner surface spaced from the first outer surface, a first side front edge, and a first side top edge;
affixing the first side plate to the face plate proximate the first lateral side by affixing the first side front edge to the rear face of the front plate portion and affixing the first side top edge to a bottom surface of the top plate portion;
providing a second side plate, the second side plate having a second outer surface, a second inner surface spaced from the second outer surface, a second side front edge, and a second side top edge;
affixing the second side plate to the face plate proximate the second lateral side by affixing the second side front edge to the rear face of the front plate portion and affixing the first side top edge to the bottom surface of the top plate portion, the first side plate and the second side plate being affixed such that the first inner surface faces the second inner surface;
providing a first gusset comprising a first gusset plate, the first gusset plate having a first portion angled relative to a second portion, a first edge comprising a portion of the first portion and the second portion, a first top edge at a distal end of the first portion, and a first bottom edge at a distal end of the second portion;
affixing the first gusset plate to the face plate and to the first side plate, the affixing comprising affixing the first edge to the first outer surface, affixing the first top edge to the bottom surface of the top plate, and affixing the first bottom edge to the rear face of the front plate;
providing a second gusset comprising a second gusset plate, the second gusset plate having a third portion angled relative to a fourth portion, a second edge comprising a portion of the third portion and the fourth portion, a second top edge at a distal end of the third portion, and a second bottom edge at a distal end of the fourth portion;
affixing the second gusset plate to the face plate and to the second side plate, the affixing comprising affixing the second edge to the second outer surface, affixing the second top edge to the bottom surface of the top plate, and affixing the second bottom edge to the rear face of the front plate.

22. The method of claim 21, wherein at least one of the affixing the first side plate, the affixing the second side plate, the affixing the first gusset or the affixing the second gusset comprises welding.

23. The method of claim 22, wherein the welding comprises fillet welding.

* * * * *